United States Patent
Ato et al.

[11] 3,939,366
[45] Feb. 17, 1976

[54] METHOD OF CONVERTING RADIOACTIVE ENERGY TO ELECTRIC ENERGY AND DEVICE FOR PERFORMING THE SAME

[75] Inventors: Yasuro Ato; Soji Miyagawa, both of Nagoya, Japan

[73] Assignee: Agency of Industrial Science & Technology, Tokyo, Japan

[22] Filed: Oct. 9, 1973

[21] Appl. No.: 404,425

Related U.S. Application Data

[63] Continuation of Ser. No. 227,545, Feb. 18, 1972, abandoned.

[30] Foreign Application Priority Data

Feb. 19, 1971  Japan .................... 46-8144

[52] U.S. Cl. ..................... 310/3 R; 310/3 C
[51] Int. Cl.² ........................... G21D 7/00
[58] Field of Search .......... 310/3 R, 3 A, 3 B, 3 C, 310/3 D

[56] References Cited
UNITED STATES PATENTS

| | | | |
|---|---|---|---|
| 2,695,930 | 11/1954 | Wallace, Jr. | 310/3 B |
| 2,745,973 | 5/1956 | Rappaport | 310/3 R |
| 2,817,776 | 12/1957 | Cohen | 310/3 R |
| 2,819,414 | 1/1958 | Sherwood et al. | 310/3 R |
| 2,847,585 | 8/1958 | Christian | 310/3 R |
| 2,892,964 | 6/1959 | Hanlet | 310/3 R |
| 2,976,433 | 3/1961 | Rappaport et al. | 310/3 R |
| 3,094,634 | 6/1963 | Rappaport | 310/3 R |
| 3,714,474 | 1/1973 | Hoff, Jr. | 310/3 |

*Primary Examiner*—Harvey E. Behrend
*Attorney, Agent, or Firm*—Kurt Kelman

[57] ABSTRACT

Radioactive energy is converted to electric energy by irradiating a converter body of semiconductor material etc. with radioactive rays to produce a number of electron-hole pairs in the converter, applying a magnetic field to the converter in a direction perpendicular to the direction of diffusion of the electron-hole pairs to separate the electrons and the holes in a direction perpendicular to the direction of diffusion of the electron-hole pairs and to the direction of application of the magnetic field and deriving the electrons and the holes from electrodes provided on the respective end faces of the converter body as electric energy.

1 Claim, 4 Drawing Figures

METHOD OF CONVERTING RADIOACTIVE ENERGY TO ELECTRIC ENERGY AND DEVICE FOR PERFORMING THE SAME

This is a continuation, of application Ser. No. 227,545 filed Feb. 18, 1972 now abandoned.

The present invention relates to a method of converting radioactive energy to electric energy and a device for performing the same method.

There is known a method of atomic energy power generation in which nuclear fission energy is converted to thermal energy and thermal energy is further converted to electric energy. With the development of such atomic energy power generation, there has been a rapid increase in the amount of radioactive substance; resulting from the reprocessing of used nuclear reactor fuel and in the radioactive fission products of nuclear reactors. Research is being carried out to find uses for these radioactive substances and, in particular, research is actively being carried out toward the development of a device for converting the radioactive energy emitted from such substances to electric energy. That is to say efforts are being put into the development of an atomic energy battery.

Heretofore, there have been known a variety of methods for converting the radioactive energy emitted from radioactive substances into electric energy and, in general, these conventional methods can be classified into the following four systems on the basis of the converting mechanism.

a. Direct converting system:

Radioactive energy emitted from the radiocative substance is directly converted to electric energy. More particularly, in one example of the system conversion is accomplished by either (i) inserting a radioactive substance (α radiation source) into a vacuum glass container, the inner wall of which is silverplated and is used as the collector electrode or (ii) surrounding a radioactive substance (β radiation source) disposed in a vacuum container with a solid state dielectric which serves as the collector electrode. However, with this system, the conversion efficiency is low, being less than 0.05%, and thus this system has not been put to practical use.

b. Two-step type converting system:

This system utilizes two steps for the energy conversion, i.e., radioactive energy emitted from the radioactive substance is used first to induce a certain physical phenomenon and then the phenomenon is caused to produce electric energy. Examples of this system which have been known are (i) to produce electron-hole pairs in a semiconductor by irradiating the semiconductor with a radioactive ray from a radioactive substance and then to derive electric current resulting from an electric field generated at the P-N junction of the semiconductor which causes electrons to move toward the N type region thereof and the holes toward the P type region thereof, (ii) to produce recoil electrons due to Compton scattering by surrounding a radioactive substance (γ radiation source) with an insulating material and then to collect the recoil electrons and (iii) to polarize a gas introduced into the space between a pair of electrodes of metals, whose work functions are different from each other, by irradiating the gas with a radioactive ray from a radioactive substance or by introducing a gaseous radioactive substance etc. into the space and inducing a voltage due to the difference in contact potential difference between the polarized gas and the respective metal electrodes. However, the energy conversion efficiency of this system is less than 0.4%.

c. Three-step type converting system:

In this system, radioactive energy from a radioactive substance is used to change the physical state of certain substances through two sequential steps and then the resulting state produces electric energy. For example, a mixture of a radioactive substance and a fluorescent material is sandwiched by a pair of photo-electric cells and the fluorescent material is illuminated by the radioactive rays from the radioactive substance. The photoelectric cells detect this luminescence and generate an electromotive force. In general, this system requires a very complex structure but nevertheless provides poor conversion efficiency on the order of less than 0.01%.

d. Heat-engine type converting system:

This system includes the thermoelectric type converting method, the thermionic type converting method and the heat engine type converting method, and, in some of these methods, there is provided a conversion efficiency as high as 5%. However, the devices used in these converting methods require very complex construction and are not economical.

As mentioned above, conventional converters of relatively simple construction generally provide relatively low conversion efficiency. On the other hand, conventional converters of more complex construction generally provide higher efficiency but are not economical.

The primary object of the present invention is to provide a two-step type converting system for converting radioactive energy to electric energy and a device for performing the same with a simple construction and with high efficiency.

Other objects and advantages of the present invention will be apparent from the following description of the preferred embodiment of the present invention with reference to the attached drawings, in which.

Figure 1:
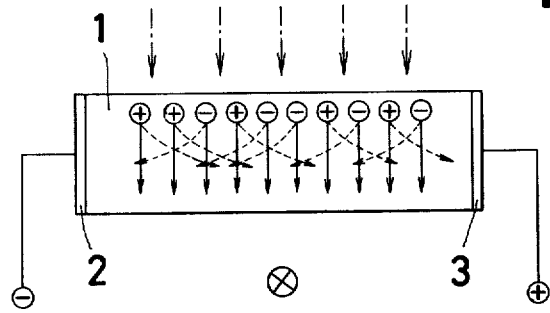
FIG. 1 is an explanatory view of the principle of the present invention.

The present conversion system belongs to the above mentioned two-step type system in the principle of its operating mechanism. Returning to the drawings, in particular, to FIG. 1 when radioactive rays irradiate a converter body 1 which is of semiconductor or compound semiconductor and which is provided with electrodes 2 and 3 on the opposite ends thereof, in a given direction, a number of electron-hole pairs are produced in the vicinity of the irradiated surface of the converter body 1 as shown. The electron-hole pairs thus produced in the irradiated region of the converter body 1 diffuse gradually toward the unirradiated region of the converter body 1, as shown by solid arrows, to eliminate the difference in density between the electrons and the holes. Under these conditions, when a magnetic field is applied to the converter body 1 in a direction perpendicular to the direction of diffusion, the paths of the diffusing electrons and holes are bent in a direction perpendicular to the direction of diffusion of the electron-hole pairs and to the direction of the magnetic field, respectively, by Lorentz force, as shown by the broken arrows, so that the holes reach the electrode 2 and the electrons reach the electrode 3. The radioactive energy is thus converted to electric energy which is derived from the electrodes 2 and 3.

Any semiconductor or compond semiconductor is suitable for use as the converter body in the present invention so long as it has a high electric charge mobility. For example, Ge, Si, InSb, GaSb, InAs, InAsP, PbSe, $Bi_2Te_3$ or PbTe etc. are appropriate as the semiconductor material.

The radioactive substance used to irradiate the converter body may be an α-ray source substance such as $^{210}$Po, $^{241}$Am or $^{238}$Pu etc., or a low energy β-ray source substance such as $^{14}$C, $^{35}$S, $^{36}$Cl, $^{147}$Pm or $^{20}$Tl etc. When a high energy β-ray source substance is used for this purpose, the tendency for the electrons and holes to diffuse is degraded because the electron-hole pairs are produced not only in the vicinity of the irradiated converter surface but also in the interior of the converter to thereby decrease the total difference in density between the irradiated surface and the interior of the converter. As an α-ray source or a low energy β-ray source is used as the radioactive ray source in the present invention, the problem of radioactive ray leakage is substantially eliminated. For example, in the case of an α-ray source, since the radiation from the α-ray source will be absorbed even by a 5 ~ 6cm sheath of air surrounding the converter the radiation shielding can be sufficiently accomplished by a casing of thin metal plate. When a β-ray source is used, a braking X-ray is emitted from the surface of the converter body upon irradiation and a thin metal casing will not be sufficient for shielding purposes. However no leakage to the exterior of such braking radiation will occur when a casing of lead plate having thickness of 3 ~ 5mm is used.

The radioactive substances produced by reprocessing of used nuclear fuel or the fission products of nuclear reaction may be used as the radioactive source in this invention.

Although the radioactive substance may be merely positioned in the vicinity of the converter body in such a manner that the radioactive rays from it irradiate one of the side surfaces of the converter body, the production of the electron-hole pairs in the converter body can be increased by painting or electrically plating the radioactive substance on the side surface of the converter body.

The magnetic field can be produced by means of a permanent magnet bonded to the converter body. A higher magnetic field provides better bending of the electrons and the holes produced in the converter body and hence higher energy conversion efficiency. It is preferable to use a magnet (such as unisotropic ferrite) which can provide relatively high magnetic field in order to keep the size of the device at a minimum.

Figure 2:
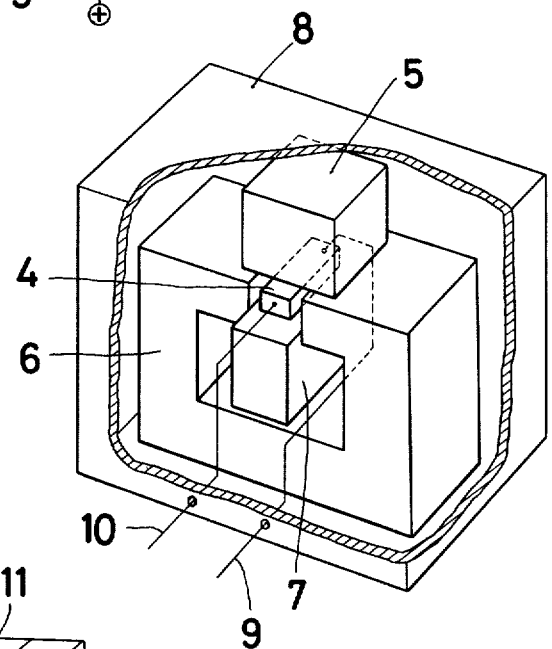
FIG. 2 is a partially removed perspective view of an embodiment of the present energy converting device.

FIG. 2 shows an embodiment of the present converter in partially removed perspective view, in which a converter body 4 is supported on a support 7 of plastic disposed within a container 8 of brass for shielding the radioactive ray. A magnet 6 is provided in order to apply a magnetic field to the converter body 4 and another container 5 containing therein a radioactive substance is provided on top of the converter body 4. The converter body 4 may, by way of example, be a Ge mono-crystaline material of 10mm in length, 3mm in width and 2mm in thickness which is substantially free from distortion resulting from its production. When radioisotope $^{210}$Po at a dose of 10 mCi (vapor deposited radiation source), is disposed above the top surface, the distance therebetween being 2mm, and a magnetic field, the strength of which is 4800 gausses, is applied to the converter body by the pair of magnets, the distance between the opposite poles thereof being 5mm, an output electric power of $3.1 \times 10^{-6}$W is obtained across electrodes 9 and 10 of the converter body 5. In this example, the efficiency of conversion from radioactive energy to electric energy was 1.4%. In this embodiment, by using a radioactive substance having a higher radioactivity and providing a higher radiation intensity than that of $^{210}$Po, by plating or painting the substance on a converter body of a material having a higher electric charge mobility than that of Ge and by applying a stronger magnetic field thereto etc., the conversion efficiency can be increased.

Figure 3:
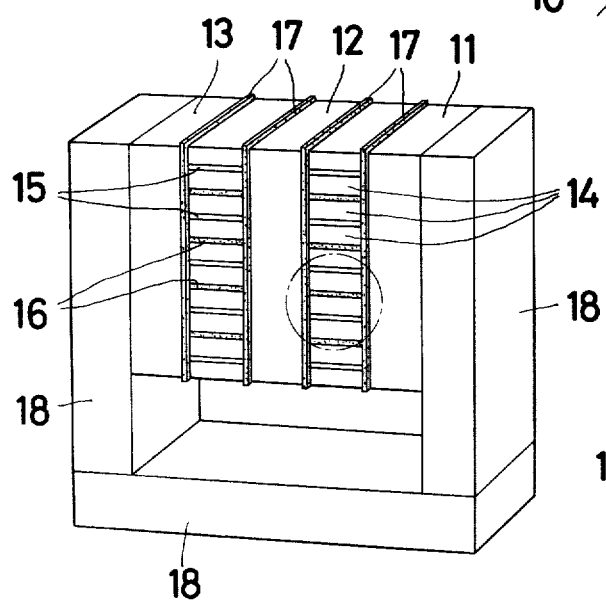
FIG. 3 is a perspective view of another embodiment of the converter device in accordance with the present invention.

FIG. 3 shows another embodiment of the present invention in perspective view in which a plurality of converter bodies are used.

As shown in this figure, three magnetic bodies 11, 12 and 13 are housed in a suitable container (not shown), which can prevent the radioactive ray from leaking to the exterior.

The arrangement of these magnetic bodies in the container is such that they are juxtaposed and equally spaced with the faces of opposite magnetic polarity facing each other.

Insulating plates 17 of such as mica are provided on the facing surfaces. In each of the spaces formed between the insulating plates, a converter body 14, an insulating plate 16 of such as mica, a converter body 14, and, so on, are stacked vertically and plate-like yoke 18 of material having high magnetic permeability is provided on the cuter surfaces of the outer most magnetic bodies 11 and 13. By arranging the converter bodies, the insulating plates and the radioactive substances in this manner, a plurality of very compact converter devices can be readily realized in each column, and by connecting the opposite electrodes (not shown) provided on the opposite ends of the converter bodies suitably in series or in parallel, a compact atomic energy battery having an excellent energy conversion efficiency can be obtained. By way of example, in one embodiment each unit converter body 14 was an InSb monocrystaline body whose size after the distortion due to fabrication was substantially removed was 10mm in length, 1.5mm in width and 0.5mm in thickness. Two stacks of ten each of such converter bodies (twenty in total) were built in the spaces or columns between the adjacent insulating plates 17 and $^{210}$Po, 5 mCi, was sandwiched between adjacent converter bodies as the radioactive substance 15. The magnetic bodies were of strontium ferrite and, when a magnetic field of 1,500 gausses was applied, an electric power of $2.7 \times 10^{-5}$W was obtained across the opposite electrodes of the battery. In this case the conversion efficiency from radioactive energy to electric energy was 1.8%. In this case, if the radioactive substance is painted or plated on the converter bodies, the battery can be further miniaturized.

Figure 4:
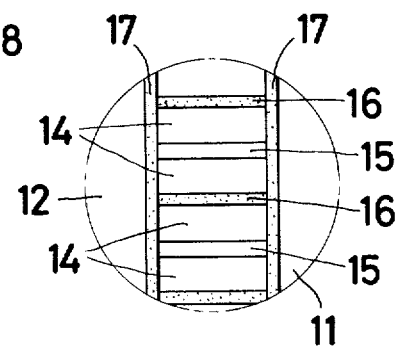
FIG. 4 is an enlarged view of the encircled portion of the device in FIG. 3.

In addition, by coating the surface of the magnetic bodies with extremely thin mica bodies or nylon coating and using electronic techniques to attach thereto semiconductor terminals and leads and then using a mask to apply semiconductor material to selected areas and radioactive substance between these areas, as shown in FIG. 4, a very compact atomic energy battery can be obtained.

The present invention provides an atomic energy battery which has a substantially higher energy conversion efficiency with respect to the conventional two-step type energy conversion system, and which is capable of being miniaturized because of its very simple construction. It further provides a battery of long life and very high reliability since no control or regulator mechanism is required and repair and maintainance are made unnecessary. The atomic energy battery in accordance with the present invention is compact and operable at high or low temperature, at high pressure or in a vacuum and even in a nongravity region.

It will be apparent that this invention is not limited to the specific structure described and that the present invention is capable of numerous variations within the scope of the appended claims.

What is claimed is:

1. A device for converting radioactive energy to electric energy, said device comprising in combination, a first, second and third magnetic body, a plurality of InSb monocrystalline semi-conductor bodies stacked vertically between said first and second and between said second and third magnetic body, each stacked plurality of semi-conductor bodies being separated from the magnetic body by an insulating plate, a layer of $^{210}$Po radioactive substance sandwiched between adjacent semi-conductor bodies and disposed to produce electron hole pairs in said semi-conductor bodies, wherein said electron hole pairs diffuse toward an unirradiated region of said semi-conductor bodies to eliminate the differences in density between electrons and holes in each of said semiconductor bodies, said magnetic bodies separating said electrons and said holes from each other by means of the resultant magnetic field wherein said electrons and holes are caused to move in a direction perpendicular to the direction of diffusion of the electron-hole pairs, and a U-shaped plate member of high magnetic permeability disposed by the leg members thereof on the outer surfaces of said first and third magnetic bodies, said U-shaped plate member supporting the magnetic bodies and said stacked semi-conductor bodies in association, each of said semi-conductor bodies having electrodes on opposite sides thereof to receive separated electron-hole pairs of electric energy generated within each of the semi-conductor bodies.

* * * * *